J. KRUTTSCHNITT.
STOP COLLAR.
APPLICATION FILED AUG. 24, 1916.
1,264,815.
Patented Apr. 30, 1918.
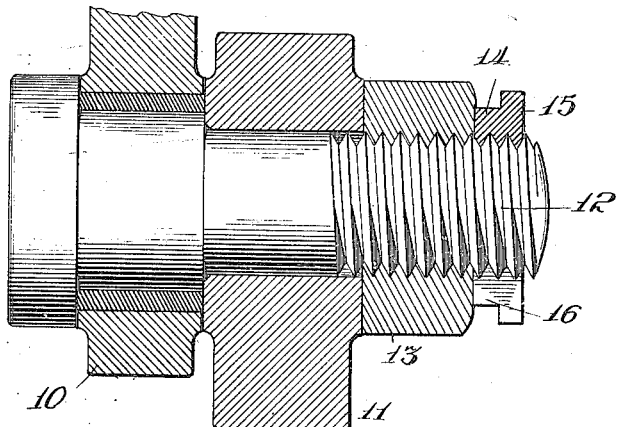
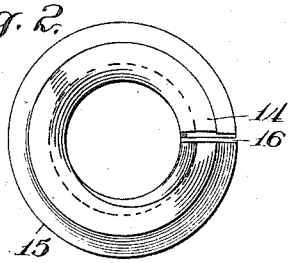
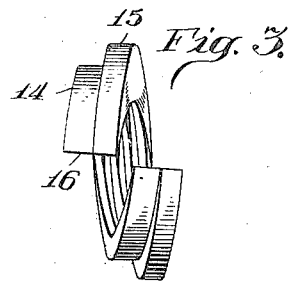
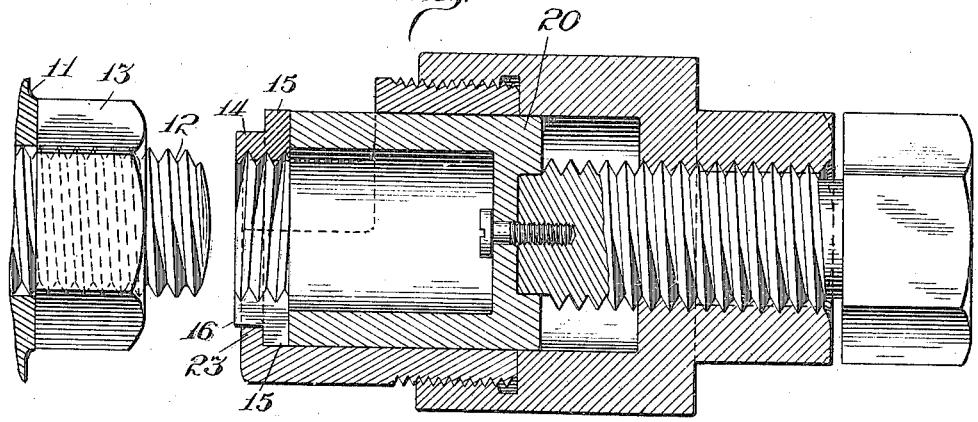
Witnesses
Milton Lenoir
L. B. Graham
Inventor
John Kruttschnitt
Heidman Street
Attorneys

UNITED STATES PATENT OFFICE.

JOHN KRUTTSCHNITT, OF CHICAGO, ILLINOIS.

STOP-COLLAR.

1,264,815.

Specification of Letters Patent.  Patented Apr. 30, 1918.

Application filed August 24, 1916.  Serial No. 116,584.

*To all whom it may concern:*

Be it known that I, JOHN KRUTTSCHNITT, a citizen of the United States, and a resident of Chicago, in the county of Cook and State of Illinois, have invented certain new and useful Improvements in Stop-Collars, of which the following is a description, reference being had to the accompanying drawing, which forms a part of my specification.

My invention relates to stop-collars intended for use in locking or maintaining nuts on bolts and the like.

The stop-collars are adapted to be applied to a bolt or threaded member provided with the usual threads either right or left handed, for the purpose of locking the bolt, or nut placed thereon, in place; the construction of my improved collar being such that when properly applied or put into place it will be impossible for the nut or bolt to become loosened through vibration or in any accidental manner. With my improved stop collar, the use of cotter pins and the like (which have a tendency to become loosened and lost) is obviated; at the same time thinner nuts may be employed than is the case where cotter pins are used without, however, impairing the holding power of the fastening means.

A further object of my invention is to provide a construction which can be readily applied and at the same time may be easily removed when desired without in any way imparing the threads of the bolt or element to which it is applied; the removal of the stop collar being merely possible by the use of a simple device, specially designed by applicant and illustrated in the accompanying drawing and described in the following detailed specification.

The gripping or holding power of the stop-collar may be varied or increased as desired; such gripping power or force being dependent upon the size and degree of flexure, as will be readily understood from the following detailed description of the accompanying drawing, therein:—

Figure 1 illustrates portions of two members secured together by means of a suitable bolt; the latter being secured in place by a nut which is shown locked in place with my improved stop-collar; the bolt being shown in elevation, while the nut and stop-collar are shown in section.

Fig. 2 is a plan view of my improved stop-collar.

Fig. 3 is a side elevation thereof.

Fig. 4 is a fragementary view of a bolt with a nut applied, shown in side elevation; with my improved means or device for applying the stop-collar, which is shown inserted in the end of the device; the means or device and stop-collar being shown in vertical section.

In the particular exemplification of the invention as illustrated, portions of two members 10 and 11 are shown held together by means of a bolt 12 of usual construction and provided with standard threads, the bolt being held in place by means of a usual nut 13. After the parts have been secured together in the usual manner as just described, the nut-receiving end of the bolt is then provided with my improved stop-collar 14 whereby the nut will be firmly held or locked in place against any accidental loosening or movement on the bolt; it being essential, however, that the threaded end of the bolt extend sufficiently beyond the nut so as to permit the stop collar to be completely screwed onto the bolt so as to have all of the stop collar threads engage with the male threads of the bolt, as illustrated in Fig. 1.

The collar 14 is preferably composed of spring steel and tapped to receive the standard threads usually employed on bolts and the like so as to permit the male threads of the bolt to firmly be engaged by the collar when the latter is applied to the bolt.

The outer perimeter of the stop collar is provided with a circumferential flange 15, preferably at what may be termed the outer or non-contacting side of the stop-collar when the latter has been put into place, to wit, the side which is not intended to contact with the nut or other member which it is adapted to lock in place, as illustrated in Fig. 1. The collar is split transversely, as clearly shown at 16 in Figs. 2 and 3, with the split ends flexed or bent into different planes or toward opposite sides of the vertical axis when the nut is in the position shown in Fig. 3, thus giving it the somewhat spiral shape, as illustrated in the drawing. As is clearly apparent from the construction shown, the holding or gripping power of the stop-collar is dependent upon the size and degree of flexure of the stop-collar, which, after having been properly applied, tends to spring apart or back into its normal condition, as illustrated, for example, in Fig. 3.

In order to apply the stop-collar to the end of the threaded member or bolt, it is necessary to spring or force the collar into condition so as to bring the split portion or ends into alinement with each other and maintain the stop-collar in such condition while it is being applied and completely screwed into place. As soon as the collar has been securely screwed against the nut and released by the means or device whereby it has been applied, the two ends, due to the resiliency of the metal, immediately tend to assume their normal position, to wit, the twisted condition of the collar, as indicated in Fig. 3. This causes the collar to form a gripping or binding relation with the male threads of the bolt or other member to which the nut has been applied, and this lateral spreading or twisting tendency of the two ends toward opposite sides of the collar will prevent any movement of the stop-collar and therefore hold it against removal except through the use of proper means or a device as illustrated in Fig. 4.

The stop-collar eliminates the use of the various forms of nut locking devices at present employed, such as cotter pins and the like, which are frequently becoming loose and lost as a result of wear, vibration or improper manipulation.

The stop-collar may be easily made out of proper metal having the necessary resiliency; can be made almost if not entirely by automatic machinery, and will in no way impair the threads of the bolt or element to which it is applied, thus permitting it to be repeatedly employed. Should it be desired to separate the parts to which the stop-collar has been applied, this may readily be accomplished by slipping a suitable device like that shown in Fig. 4 laterally or edgewise onto the collar, then screwing plunger 20 of said device firmly against the collar so as to clamp it between the plunger 20 and the flange 23 which will cause the two ends to be held in alinement, thereby allowing the collar to be unscrewed and removed from the bolt. The gripping force obtained by the flexure of the metal will prevent the collar from becoming accidentally or improperly loosened, and provides economical means for securely locking bolted elements together; obviating the expense and difficulties heretofore encountered through the loosening and loss of nuts and the like.

I have shown and described what I believe to be the simplest and best form of the invention, which may, however, be modified in certain details of construction without, however, departing from the spirit of my invention.

What I claim is:—

1. A stop collar, comprising an apertured member of resilient metal, the aperture being provided with threads of the same pitch as the threads of the bolt to which the member is to be applied when the stop collar is in applied position, said member being split transversely from aperture to perimeter and twisted uniformly so as to have the forward side of one end disposed in a plane beyond that occupied by the rear side of the other end.

2. A stop collar, comprising an internally threaded member of resilient metal split radially with the outer perimeter provided with a tool-engaging flange, the member being uniformly twisted into spiral formation having an inclination approximating the inclination of its internal threads.

JOHN KRUTTSCHNITT.

Witnesses:
F. A. FLORELL,
N. A. STREET.

Copies of this patent may be obtained for five cents each, by addressing the "Commissioner of Patents, Washington, D. C."